Patented May 30, 1950

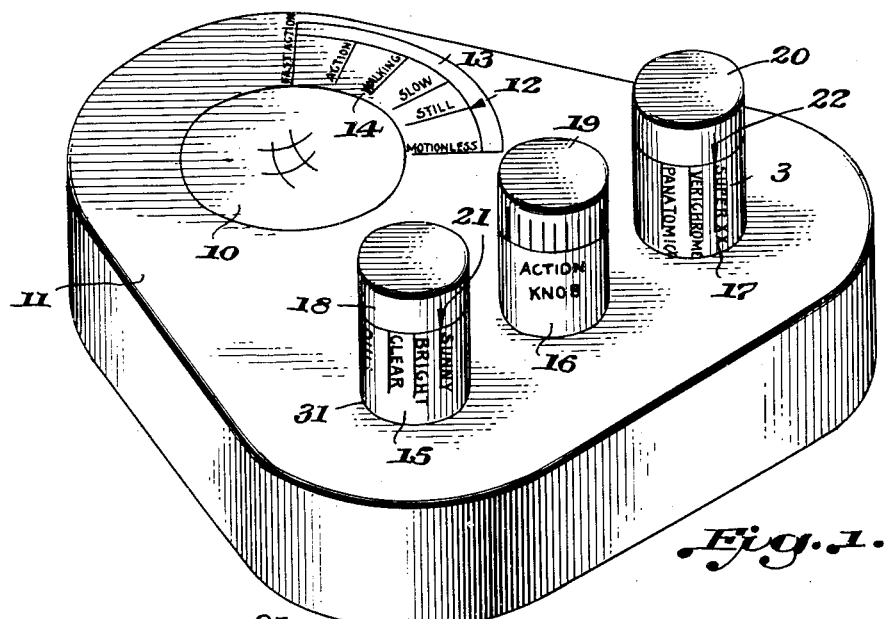
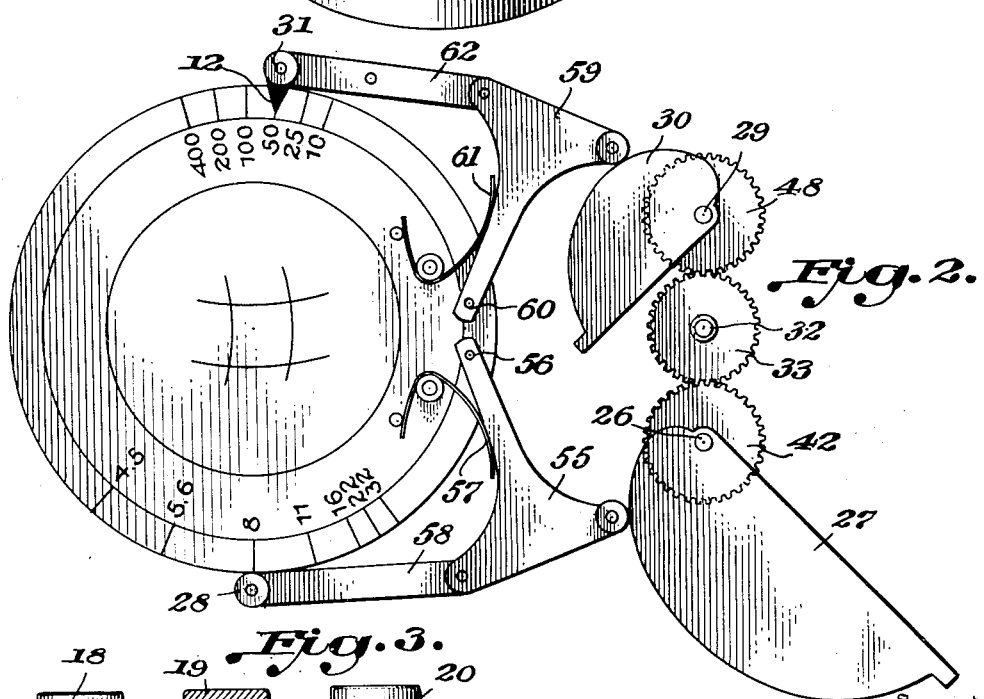
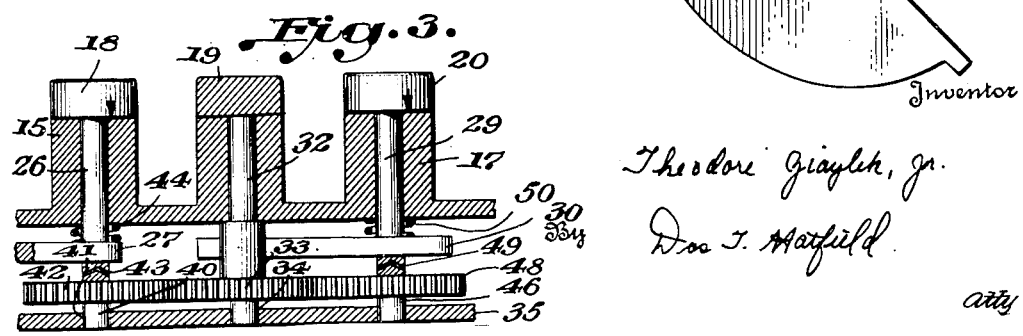

2,509,385

UNITED STATES PATENT OFFICE 2,509,385

CAMERA SHUTTER AND DIAPHRAGM CONTROL MECHANISM

Theodore Ziaylek, Jr., Philadelphia, Pa.

Application June 1, 1948, Serial No. 30,381

2 Claims. (Cl. 95—64)

1

The present invention relates to cameras and more particularly to an improved camera shutter.

Most of the cameras used at the present time are provided with rather complicated shutter mechanisms having a number of adjustments to be made by the camera operator when taking a picture. These types of cameras are provided with at least a shutter speed adjustment and an aperture size adjustment. If the camera operator is to be assured of taking uniformly good pictures of average exposure density, he must correlate the adjustments of shutter speed and aperture with other known conditions under which the pictures are taken, such as the speed of the film used, the amount of light on the picture subject, and the speed of the action to be stopped in the picture subject. The professional camera expert knows from experience how to correlate such factors when adjusting his camera to take pictures, but the average person using a camera to infrequently take pictures for his own pleasure is usually baffled by the complexities of the shutter adjustments and does not properly correlate such adjustments under the conditions of camera use.

It is a principal object of this invention to provide an improved camera shutter having shutter speed and aperture adjustments which are automatically correlated with each other under all conditions of use to which the camera will respond.

Another important object of this invention is to provide an improved camera shutter which will enable any inexperienced or experienced camera operator to take uniformly good pictures of average exposure density and which will be exceedingly simple to operate, the shutter being provided with correlated adjustments of shutter speed and aperture size which, when set to known conditions of film speed and subject lighting, requires only a single re-adjustment for subject action speed to take subsequent pictures of different action.

Further objects and advantages of this invention will be apparent with reference to the following specification and drawing in which:

Figure 1 is a perspective view of the camera shutter of this invention;

Figure 2 is a diagrammatic plan view of the mechanism for correlating the adjustments of shutter speed and aperture size; and

2

Figure 3 is a fragmentary sectional view on the line 3—3 of Figure 1.

Referring to Figure 1 of the drawings, the camera shutter of this invention is shown apart from the associated camera which may be of any suitable type or make. The camera lens is shown at 10 and the usual shutter speed and aperture size adjusting levers (not shown in Figure 1) are enclosed within the housing 11. An indicator mark 12 can be seen through an arc-like opening 13 in the housing 11 and functions to indicate the adjusted position of the shutter speed adjusting lever. It may be desirable that action calibrations in simplified terminology be used together with the indicator 12 such as shown at 14 to facilitate the adjustment of the camera by inexperienced camera operators as will be later described in detail.

Mounted on the housing 11 are a number of stationary cylindrical bearing members 15, 16 and 17 carrying the rotatable shutter adjusting knobs 18, 19 and 20, respectively. Knob 18 is the aperture size adjusting knob for initially setting the camera aperture size to known conditions of subject lighting. An indicator 21 to cooperate with suitable calibrations in simplified terminology with reference to the amount of light on the picture subject may be provided. Knob 20 is the shutter speed adjusting knob which may be used to initially set the shutter speed for a known film speed of the film being used in the camera and, accordingly, may also be provided with an indicator 22 to cooperate with calibrations for different types of films having different film speeds. Knob 19 may be termed the action knob and is used to simultaneously turn both knobs 18 and 20 in proper correlation to adjust the position of the shutter speed indicator 12 to the desired action speed of the picture subject.

Referring to Figures 2 and 3 of the drawings, a preferred mechanical system of gearing and levers to connect in correlated movements the movements of each of the knobs 18, 19 and 20 with their respective adjustments is shown. Knob 18 is fastened to a shaft 26 journaled in the bearing 15. Also fastened to the shaft 26 is a cam 27 having a cam rise equal to the distance between the adjusted positions of the aperture size adjusting lever 28 for the largest and smallest "f" opening and a rate of cam rise corresponding to the distances between the various "f" openings.

Similarly, knob 20 is fastened to a shaft 29 journalled in the boss 17 and a cam 30 is also fastened to the shaft 29. The cam 30 is provided with a cam rise equal to the distance between the adjusted positions of the shutter speed adjusting lever 31 for the fastest and slowest shutter speed and with a rate of rise corresponding to the distances between the positions of the various shutter speeds. Knob 19 is fastened to the shaft 32 having a gear 33 at its other end journalled at 34 in the back member 35 of the shutter housing.

As shown most clearly in Figure 3, a short shaft 40 is journalled at 41 in the member 35 and carries a gear 42 of equal dimensions to gear 33 with which it meshes. The upper end of shaft 40 is provided with a clutch surface 43 normally engaging a similar clutch surface on the end of shaft 26. A compression spring 44 normally urges the clutch surfaces on the ends of shafts 26 and 40 into engagement, but when knob 18 is lifted and rotated, the cam 27 may be rotated without rotating gear 42.

Similarly, a short shaft 46 is journalled at 47 in the member 35 and carries a gear 48 of equal dimensions to gear 33 with which it meshes. The upper end of shaft 46 is provided with a clutch surface 49 normally engaging a similar clutch surface on the end of shaft 29. A compression spring 50 normally urges the clutch surfaces on the ends of shafts 29 and 46 into engagement, but when knob 20 is lifted and rotated, the cam 30 may be rotated without rotating gear 48.

As shown in Figure 2 of the drawing, a cam follower 55 is pivoted at 56 and constrained to follow the rise of cam 27 by the spring 57. The movement of the cam follower 55 is transferred to the aperture size lever 28 through a pivotally connected link 58. Similarly, a cam follower 59 is pivoted at 60 and constrained to follow the rise of cam 30 by a spring 61. The movement of the cam follower 59 is transmitted to the shutter speed adjusting lever 31 through a pivotally connected link 62. It should be understood that the exact arrangement of cams and levers just described is but illustrative of a preferred form of the invention and that any form of cam and lever system suitable to the purpose may be used. For example, where a more compact shutter mechanism is desired, smaller cams may be used and amplifying lever systems may be connected between the cam followers and the associated camera adjusting levers.

The operation of the camera shutter adjusting mechanism of this invention will now be described. Assuming the camera to be loaded with a film such as "Super XX," as a first operational step, the knob 20 is lifted and rotated until the indicator 22 registers with the "Super XX" calibration on the bearing 17. This operation is effective to individually rotate cam 30 and initially adjust the shutter speed for a known film speed. The second operational step is to lift and rotate knob 18 until the indicator 21 is registered with a calibration on the bearing 15 corresponding to the known condition of subject lighting such as, for example, a sunny day. This second operational step is effective to individually rotate cam 27 and initially adjust the "f" opening for known light conditions such as a sunny day. The third and last operational step is to rotate knob 19 which, through the medium of gears 33, 42 and 48, simultaneously rotates cams 27 and 30 until the indicator 12 is in correct registry with the indication for the action of the subject. The correlation of movement for both the shutter speed and aperture size adjustments is, of course, in the sense that higher shutter speeds should have lower "f" settings or larger aperture openings. It should be obvious, that so long as the film speed and conditions of light remain the same, the only readjustment of the camera for subsequent pictures, is the rotation of knob 19, to simultaneously move both the aperture size lever and the shutter speed lever to new correlated positions for different action speeds of the subject.

All cameras have a range limit beyond which they cannot successfully take pictures and this limit is determined by shutter speed limitations and light gathering power of the lens. With the shutter adjusting mechanism of this invention, it is impossible to adjust the camera to take a picture beyond the range of the camera so long as the three operational steps described above are followed in their correct sequence, thus informing the camera operator and saving film which might have been wasted on impossible picture situations. It should also be understood that the positioning and number of calibrations in association with the indicators for knobs 18, 19 and 20 will be determined by the type and limitations of the camera to which the shutter is attached.

The shutter speed mechanisms and diaphragm apertures have not been particularly described since the system of this invention may be applied to any camera shutter having adjustable shutter speed and aperture size of well known designs.

I claim:

1. A camera shutter having a first movable element for adjustment of aperture size and a second movable element for adjustment of shutter speed, a first rotatable shaft having a cam and associated lever connected to the first of said elements, a second rotatable shaft having a cam and associated lever connected to the second of said elements, each of said cams having a rise and rate of rise for actuating the associated lever to move the respective first and second elements over their entire range of adjustment in correlated movement to the rotation of the respective cam in its active range of movement, a first gear adapted to be clutched to said first shaft, a second gear adapted to be clutched to said second shaft, a third rotatable shaft having a gear meshing with said first and second gears whereby the rotation of said third shaft during the time said first and second gears are clutched to their respective shafts will cause a simultaneous adjustment of shutter speed and aperture size in correlated movement.

2. A camera shutter having a first movable element for adjustment of aperture size and a second movable element for adjustment of shutter speed, a first rotatable shaft having a cam and associated lever connected to the first of said elements, a second rotatable shaft having a cam and associated lever connected to the second of said elements, each of said cams having a rise and rate of rise for actuating the associated lever to move the respective first and second elements over their entire range of adjustment in correlated movement to the rotation of the respective cam in its active range of movement, a first gear adapted to be clutched with associated clutch means to said first shaft, a second gear adapted to be clutched with associated clutch means to said second shaft, a third rotatable shaft having a gear meshing with said first and second gears whereby the rotation of said third shaft during the time said first and second gears are clutched to their respective shafts will cause a simultaneous adjustment of shutter speed and aperture size in correlated movement, said first and second rotatable shafts and associated clutch means being operable to permit the individual rotation of said first and second shafts to individually adjust the aperture size and shutter speed.

THEODORE ZIAYLEK, Jr.

REFERENCES CITED

The following references are of record in the file of this patent:

UNITED STATES PATENTS

| Number | Name | Date |
| --- | --- | --- |
| 883,607 | Andrews | Mar. 31, 1908 |
| 1,543,208 | Fairchild | June 23, 1925 |
| 1,546,060 | Carmine | July 14, 1925 |
| 2,020,036 | Marks | Nov. 5, 1935 |
| 2,209,156 | Fischer | July 23, 1940 |

FOREIGN PATENTS

| Number | Country | Date |
| --- | --- | --- |
| 147,573 | Austria | Nov. 10, 1936 |